(12) United States Patent
Hsiao et al.

(10) Patent No.: US 11,750,111 B2
(45) Date of Patent: Sep. 5, 2023

(54) POWER SUPPLY DEVICE, POWER SUPPLY MANAGEMENT MODULE, AND POWER SUPPLY MANAGEMENT METHOD

(71) Applicant: Chicony Power Technology Co., Ltd., New Taipei (TW)

(72) Inventors: Yung-Hung Hsiao, New Taipei (TW); Chia-Hsien Yen, New Taipei (TW); Hao-Chieh Chang, New Taipei (TW); Cheng-Chang Hsiao, New Taipei (TW); Da-Shian Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 3 days.

(21) Appl. No.: 17/528,519

(22) Filed: Nov. 17, 2021

(65) Prior Publication Data

US 2023/0106008 A1 Apr. 6, 2023

(30) Foreign Application Priority Data

Oct. 5, 2021 (TW) .................................. 110137094

(51) Int. Cl.
*H02M 7/04* (2006.01)
*H02M 7/537* (2006.01)
*H02M 1/44* (2007.01)

(52) U.S. Cl.
CPC ............. *H02M 7/537* (2013.01); *H02M 1/44* (2013.01)

(58) Field of Classification Search
CPC ............ H02J 3/005; H02M 7/02; H02M 7/04; H02M 7/06; H02M 1/44; H02M 1/0067; H02M 7/53; H02M 7/537
See application file for complete search history.

(56) References Cited

U.S. PATENT DOCUMENTS

| | | | |
|---|---|---|---|
| 6,542,023 B1 * | 4/2003 | Daun-Lindberg | H03K 17/735 307/85 |
| 6,674,271 B2 | 1/2004 | Choo et al. | |

(Continued)

FOREIGN PATENT DOCUMENTS

| | | |
|---|---|---|
| CN | 200950553 | 9/2007 |
| CN | 101964599 A | 2/2011 |

(Continued)

*Primary Examiner* — Gary L Laxton
(74) *Attorney, Agent, or Firm* — Andrew M. Calderon; Calderon Safran & Cole, P.C.

(57) ABSTRACT

A power supply device, a power supply management module and method are provided. The power supply device includes a power supply management module. The power supply management module includes a first and a second power supply module, a detection unit, and a switching control module. The first power supply module includes a first alternating current input end, a first rectifier circuit, and a first switch unit. A first end of the first switch unit is connected to the first rectifier circuit. The second power supply module includes a second alternating current input end, a second rectifier circuit, and a second switch unit. A third end and a fourth end of the second switch unit are connected to the second rectifier circuit and a second end of the first switch unit, respectively. The switching control module controls the first and the second switch unit according to a detection signal.

18 Claims, 12 Drawing Sheets

(56) References Cited

U.S. PATENT DOCUMENTS

| | | | |
|---|---|---|---|
| 7,898,111 B1* | 3/2011 | Pistel | H02J 1/102 |
| | | | 307/82 |
| 2014/0201018 A1 | 7/2014 | Chassin | |
| 2016/0056632 A1* | 2/2016 | Hansson | H02M 7/1623 |
| | | | 307/52 |
| 2019/0027959 A1 | 1/2019 | Lee et al. | |

FOREIGN PATENT DOCUMENTS

| | | |
|---|---|---|
| CN | 106230262 A | 12/2016 |
| CN | 207652128 | 7/2018 |
| CN | 208190339 | 12/2018 |
| CN | 209642395 | 11/2019 |
| CN | 111245628 A | 6/2020 |
| TW | M433025 | 7/2012 |
| TW | 201320140 | 5/2013 |
| TW | I536709 | 6/2016 |
| TW | M534932 U | 1/2017 |
| TW | 201743535 | 12/2017 |
| TW | 201909544 | 3/2019 |

\* cited by examiner

POWER SUPPLY DEVICE, POWER SUPPLY MANAGEMENT MODULE, AND POWER SUPPLY MANAGEMENT METHOD

CROSS-REFERENCE TO RELATED APPLICATION

This non-provisional application claims priority under 35 U.S.C. § 119(a) to patent application Ser. No. 11/013,7094 in Taiwan, R.O.C. on Oct. 5, 2021, the entire contents of which are hereby incorporated by reference.

BACKGROUND

Technical Field

The present invention is related to power supply and conversion technologies, and in particular, to a power supply device having a power management function and an integrated power conversion module.

Related Art

A power supply device may be said to be a heart of an electronic device, which directly affects the performance of the electronic device. To ensure stable power supply for the electronic device and minimized power supply costs, power usually needs to be managed. Therefore, how to manage the power with lower circuit complexity and lower hardware costs is indeed an important topic at present. Furthermore, a transformer and electronic components of a power converter in a conventional power supply device are usually configured independently on a circuit board, and are electrically connected through circuit wiring formed on the circuit board. However, such a configuration occupies a lot of space of the circuit board, and becomes a main reason why an overall volume of a high-power power conversion system and even the power supply device cannot be miniaturized. In addition, how to integrate power supply management hardware with the power converter is also a topic worthy studying.

SUMMARY

In view of this, the present invention provides a power supply device, a power supply management module, and a power supply management method, to alleviate the existing technical problems.

An embodiment of the present invention provides a power supply device. The power supply device includes a power supply management module and a power supply module. The power supply management module outputs a rectified voltage, and the power supply module receives the rectified voltage and outputs a conversion voltage. The power supply management module includes a first power supply module, a second power supply module, a detection unit, and a switching control module. The first power supply module includes a first alternating current input end, a first rectifier circuit, and a first switch unit. The first alternating current input end receives a first AC voltage, and the first rectifier circuit rectifies the first AC voltage. The first switch unit includes a first end and a second end, and the first end of the first switch unit is connected to the first rectifier circuit. The second power supply module includes a second alternating current input end, a second rectifier circuit, and a second switch unit. The second alternating current input end receives a second AC voltage, and the second rectifier circuit rectifies the second AC voltage. The second switch unit includes a third end and a fourth end, the third end of the second switch unit is connected to the second rectifier circuit, and the fourth end of the second switch unit is connected to the second end of the first switch unit. The detection unit detects the first alternating current input end and the second alternating current input end, and outputs a detection signal. The switching control module receives the detection signal, and controls on and off of the first switch unit and the second switch unit according to the detection signal, so that one of the first power supply module and the second power supply module outputs the rectified voltage.

In some embodiments, the power supply module further includes a first conversion circuit, a second conversion circuit, and an integrated power conversion module. The first conversion circuit is connected to the second end of the first switch unit and the fourth end of the second switch unit, and is configured to convert the rectified voltage into a direct current high voltage and adjust a power factor of the direct current high voltage. The second conversion circuit is connected to the first conversion circuit, and is configured to adjust the direct current high voltage. The integrated power conversion module includes a primary winding, a first power module, and an iron core. The primary winding is connected to the second conversion circuit, and receives the adjusted direct current high voltage. The first power module is a detachable module that is pluggable or configurable. The first power module includes a first circuit board, and the first circuit board includes a first placement portion and a first sensing portion. The first placement portion includes a fifth end and a sixth end, where the fifth end is connected to the first sensing portion, and the sixth end is electrically connected to a main circuit board. The first sensing portion includes a first center hole. A first secondary winding is disposed on the first sensing portion. A first synchronous rectification unit is disposed on the first circuit board, and receives a first output voltage of the first secondary winding. The iron core is inserted in the first center hole.

An embodiment of the present invention provides a power supply management module. The power supply management module includes a first power supply module, a second power supply module, a detection unit, and a switching control module. The first power supply module includes a first alternating current input end, a first rectifier circuit, and a first switch unit. The first alternating current input end receives a first AC voltage, and the first rectifier circuit rectifies the first AC voltage. The first switch unit includes a first end and a second end, and the first end of the first switch unit is connected to the first rectifier circuit. The second power supply module includes a second alternating current input end, a second rectifier circuit, and a second switch unit. The second alternating current input end receives a second AC voltage, and the second rectifier circuit rectifies the second AC voltage. The second switch unit includes a third end and a fourth end, the third end of the second switch unit is connected to the second rectifier circuit, and the fourth end of the second switch unit is connected to the second end of the first switch unit. The detection unit detects the first alternating current input end and the second alternating current input end, and outputs a detection signal. The switching control module receives the detection signal, and controls on and off of the first switch unit and the second switch unit according to the detection signal, so that one of the first power supply module and the second power supply module outputs a rectified voltage.

An embodiment of the present invention provides a power supply management method applicable to a power supply management module. The method includes the following steps: receiving, by a first alternating current input end, a first AC voltage, and rectifying, by a first rectifier circuit, the first AC voltage; receiving, by a second alternating current input end, a second AC voltage, and rectifying, by a second rectifier circuit, the second AC voltage; detecting, by a detection unit, the first alternating current input end and the second alternating current input end, and outputting a detection signal; and receiving, by a switching control module, the detection signal, and controlling on and off of a first switch unit and a second switch unit according to the detection signal, so that one of a first power supply module and a second power supply module outputs a rectified voltage.

Based on the above, according to the power supply management module and the power supply management method provided by the embodiments of the present invention, after the first alternating current input end or the second alternating current input end receives an external AC voltage, the rectifier circuit rectifies the external AC voltage into a lower-voltage direct current, which can make subsequent processing circuit components bear a lower voltage or components with a lower rated withstand voltage be selected. The integrated power conversion module of the power supply device provided by the embodiments of the present invention has features such as a simple structure and a small volume. The advantages of the above embodiments can reduce an overall volume of the power supply device, so that the power supply device is adapted to be integrated on the single main circuit board.

DETAILED DESCRIPTION

Figure 1:
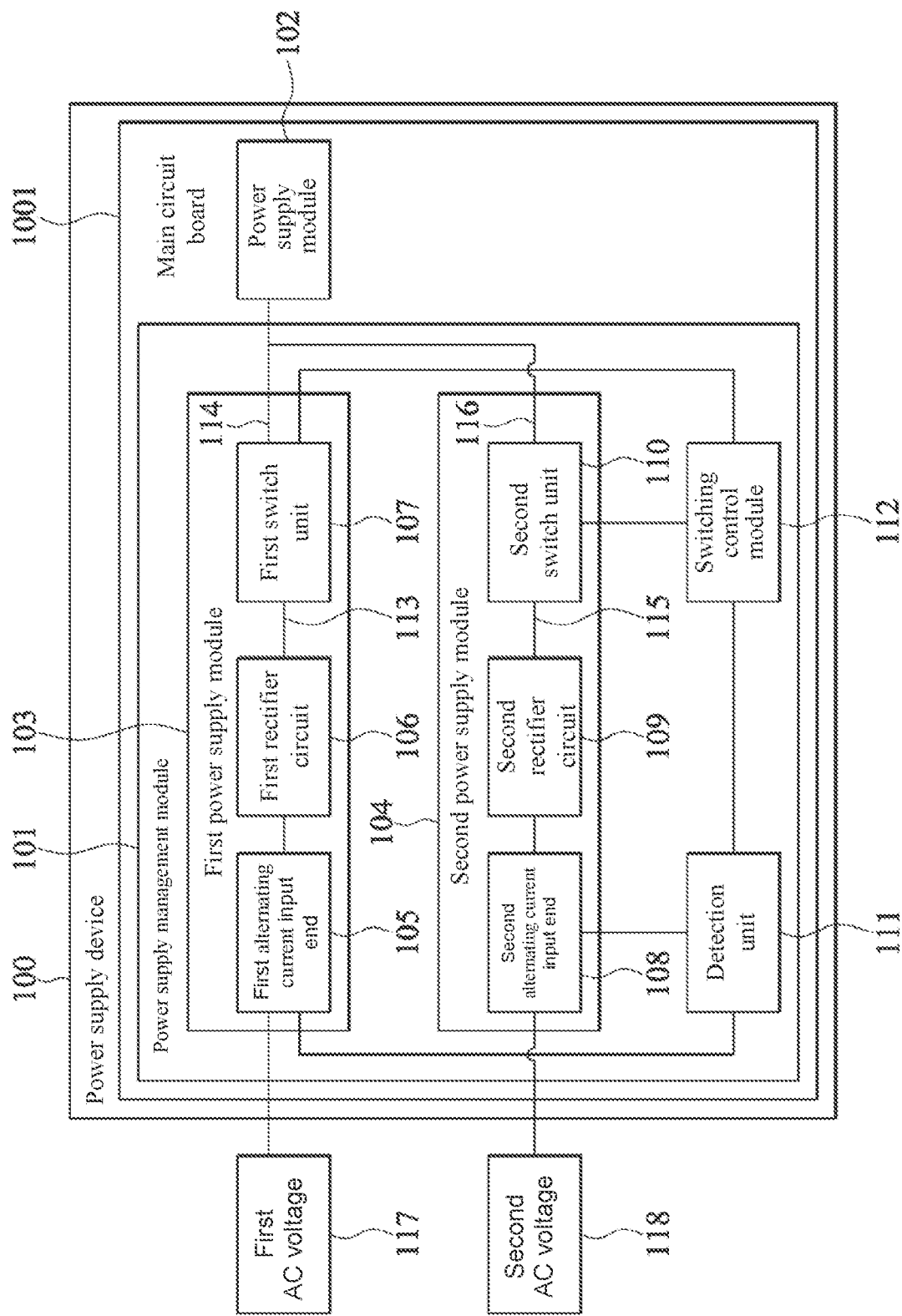
FIG. 1 illustrates a system block diagram of a power supply device according to an embodiment of the present invention.

The foregoing and other technical content, features, and effects of the present invention can be clearly presented below in detailed description with reference to embodiments of the accompanying drawings. Thicknesses or sizes of the components in the drawings are expressed in an exaggerated, omitted or general manner for a person skilled in the art to understand and read, and the sizes of components are not completely actual sizes and are not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numbers in the drawings are used to indicate the same or similar components. The term "coupled" or "connected" mentioned in the following embodiments may refer to any direct or indirect connection means.

FIG. 1 illustrates a system block diagram of a power supply device according to an embodiment of the present invention. Referring to FIG. 1, the power supply device 100 includes a power supply management module 101 and a power supply module 102. The power supply management module 101 may receive a first AC voltage 117 and a second AC voltage 118 from the outside. The power supply management module 101 outputs a rectified voltage, and the power supply module 102 receives the rectified voltage output by the power supply management module 101 and outputs a conversion voltage. Both the power supply management module 101 and the power supply module 102 are disposed on a main circuit board 1001.

The power supply management module 101 includes a first power supply module 103, a second power supply module 104, a detection unit 111, and a switching control module 112. The first power supply module 103 includes a first alternating current input end 105, a first rectifier circuit 106, and a first switch unit 107. The second power supply module 104 includes a second alternating current input end 108, a second rectifier circuit 109, and a second switch unit 110.

The first alternating current input end 105 of the first power supply module 103 may receive the first AC voltage 117 from the outside, and then the first rectifier circuit 106 rectifies the received first AC voltage 117. The first switch unit 107 includes a first end 113 and a second end 114, where the first end 113 is connected to the first rectifier circuit 106. The second alternating current input end 108 of the second power supply module 104 may receive the second AC voltage 118 from the outside, and the second rectifier circuit 109 may rectify the received second AC voltage 118. The second switch unit 110 includes a third end 115 and a fourth end 116, where the third end 115 is connected to the second rectifier circuit 109, and the fourth end 116 is connected to the second end 114 of the first switch unit 107.

The detection unit 111 detects the first alternating current input end 105 and the second alternating current input end 108, and outputs a detection signal. The detection signal indicates whether the first alternating current input end 105 receives the first AC voltage 117 from the outside and whether the second alternating current input end 108 receives the second AC voltage 118 from the outside. The switching control module 112 receives the detection signal, and controls on and off of the first switch unit 107 and the second switch unit 110 according to the detection signal, so that one of the first power supply module 103 and the second power supply module 104 outputs the rectified voltage.

Figure 10:
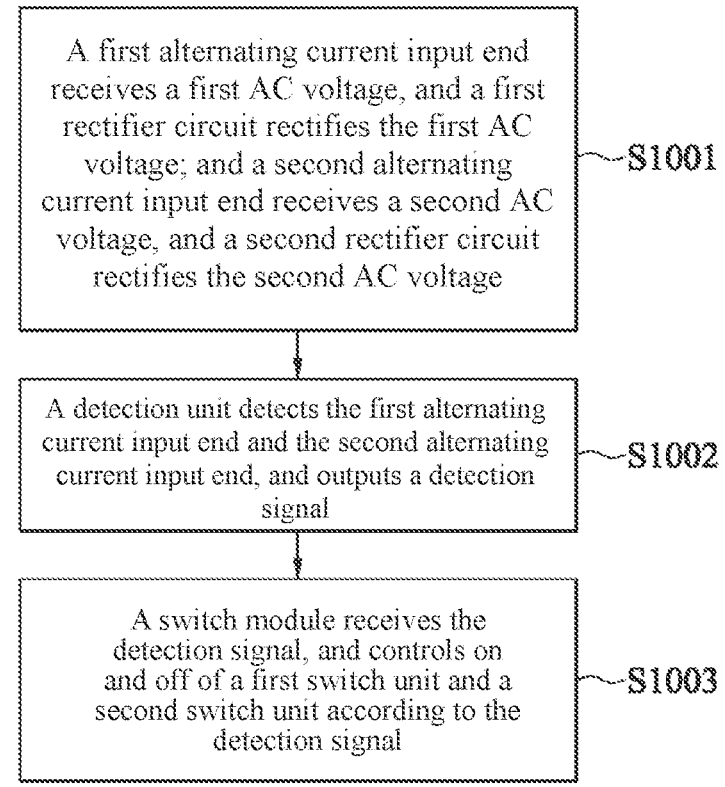
FIG. 10 illustrates a flowchart of a power supply management method according to an embodiment of the present invention.
Figure 11:
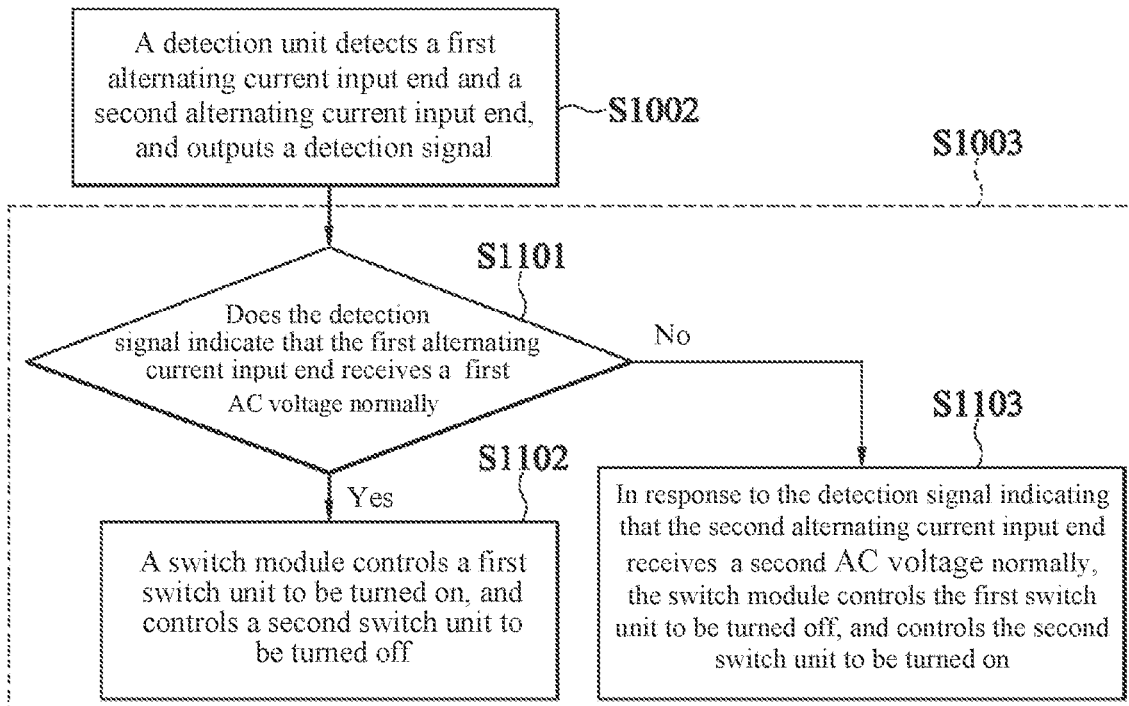
FIG. 11 illustrates a flowchart of a power supply management method according to an embodiment of the present invention.

The power supply management method and cooperation between hardware of the power supply management module 101 according to an embodiment of the present invention are described in detail below with reference to the drawings. FIG. 10 illustrates a flowchart of a power supply management method according to an embodiment of the present invention, and FIG. 11 illustrates a flowchart of a power supply management method according to an embodiment of the present invention.

In step S1001, the first alternating current input end 105 receives the first AC voltage 117 from the outside. The second alternating current input end 108 receives the second AC voltage 118 from the outside. The first rectifier circuit 106 rectifies the first AC voltage 117 received by the first alternating current input end 105. The second rectifier circuit 109 rectifies the second AC voltage 118 received by the second alternating current input end 108. In step S1002, the detection unit 111 detects the first alternating current input end 105 and the second alternating current input end 108, and outputs the detection signal; and the detection signal indicates whether the first alternating current input end 105 receives the first AC voltage 117 from the outside and whether the second alternating current input end 108 receives the second AC voltage 118 from the outside. In this embodiment, if the detection signal indicates that the first alternating current input end 105 receives the first AC voltage 117, it represents that the detection unit 111 detects that a voltage of the first AC voltage 117 received by the first alternating current input end 105 is within a normal range. Similarly, if the detection signal indicates that the second alternating current input end 108 receives the second AC voltage 118, it represents that the detection unit 111 detects that a voltage of the second AC voltage 118 received by the second alternating current input end 108 is within a normal range. In step S1003, the switching control module 112 receives the detection signal, and controls the on and off of the first switch unit 107 and the second switch unit 110 according to the detection signal, so that one of the first power supply module 103 and the second power supply module 104 outputs the rectified voltage.

In an embodiment of the present invention, the foregoing step S1003 further includes step S1101 to step S1103. In step S1101, after receiving the detection signal, the switching control module 112 determines whether the detection signal indicates that the first alternating current input end 105 receives the normal first AC voltage 117. In step S1102, in response to the detection signal indicating that the first alternating current input end 105 receives the normal first AC voltage 117, the switching control module 112 controls the first switch unit 107 to be turned on, and controls the second switch unit 110 to be turned off. If the detection signal indicates that the first alternating current input end 105 does not receive the normal first AC voltage 117, in step S1103, in response to the detection signal indicating that the second alternating current input end 108 receives the normal second AC voltage 118, the switching control module 112 controls the first switch unit 107 to be turned off, and controls the second switch unit 110 to be turned on.

In the architecture provided by this embodiment, after the first alternating current input end 105 or the second alternating current input end 108 receives an external AC voltage, the rectifier circuit rectifies the external AC voltage into a lower-voltage direct current, which can make the components behind the rectifier circuit bear a lower voltage or the components with a lower rated withstand voltage be selected.

In an embodiment of the present invention, the switching control module 112 detects whether a special mode request transmitted externally is received. If the switching control module 112 detects the special mode request transmitted externally, the switching control module 112 determines, according to the detection signal, whether the second alternating current input end 108 receives the second AC voltage 118. If the switching control module 112 determines that the second alternating current input end 108 receives the second AC voltage 118, the switching control module 112 controls the first switch unit 107 to be turned off and controls the second switch unit 110 to be turned on according to the special mode request, so that the second AC voltage 118 provides electric energy. In this embodiment, the first AC voltage 117 is alternating mains electricity provided by a first electric power company, and the second AC voltage 118 is alternating mains electricity provided by a second electric power company. A determining module external to the power supply device 100 continuously and automatically retrieves real-time electricity prices of the alternating mains electricity provided by the first electric power company and the second electric power company from the Internet. Once the determining module determines that the electricity price of the alternating mains electricity provided by the second electric power company is cheaper, the determining module externally transmits the special mode request to the switching control module 112.

In an embodiment of the present invention, the first AC voltage 117 is alternating mains electricity provided by an electric power company, and the second AC voltage 118 is a backup power source, such as an alternating current output by a diesel generator.

Figure 2A:
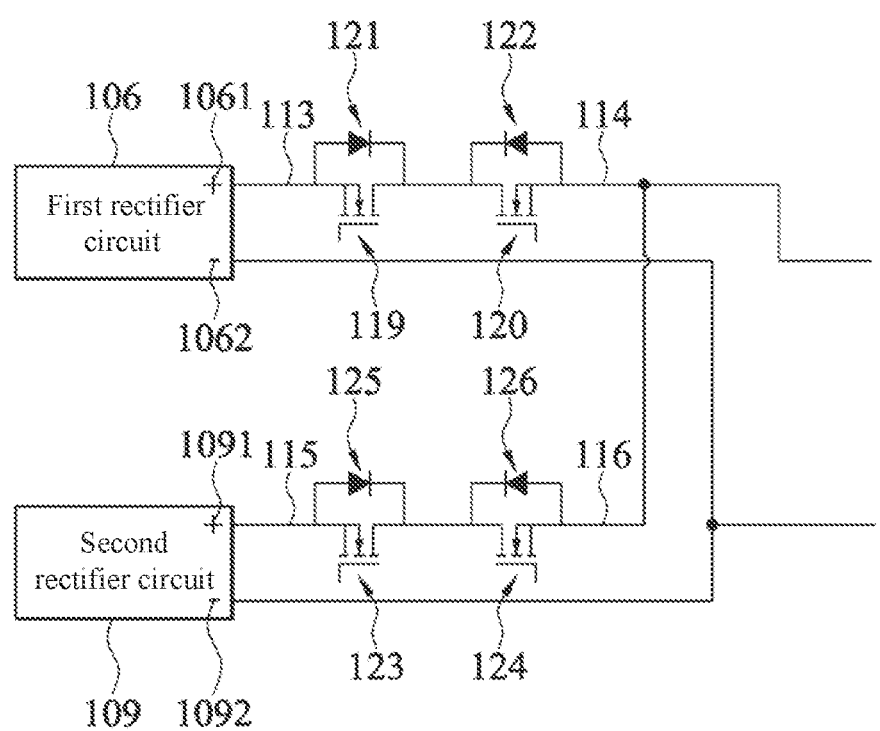
FIG. 2A illustrates a schematic partial circuit diagram of a first power supply module and a second power supply module according to an embodiment of the present invention.

FIG. 2A illustrates a schematic partial circuit diagram of a first power supply module and a second power supply module according to an embodiment of the present invention. Referring to FIG. 2A, in this embodiment, an output end of the first rectifier circuit 106 includes a positive electrode 1061 and a negative electrode 1062. The first switch unit 107 includes a first transistor 119 and a second transistor 120. The first transistor 119 and the second transistor 120 are MOS field effect transistors. A drain of the first transistor 119 is connected to a drain of the second transistor 120, and a source of the first transistor 119 is the first end 113 of the first switch unit 107, and is connected to the positive electrode 1061 of the first rectifier circuit 106. A source of the second transistor 120 is the second end 114 of the first switch unit 107. The first transistor 119 is connected in parallel to a first diode 121, the source of the first transistor 119 is connected to an anode of the first diode 121, and the drain of the first transistor 119 is connected to a cathode of the first diode 121. The second transistor 120 is connected in parallel to a second diode 122, the source of the second transistor 120 is connected to an anode of the second diode 122, and the drain of the second transistor 120 is connected to a cathode of the second diode 122.

An output end of the second rectifier circuit 109 includes a positive electrode 1091 and a negative electrode 1092. The second switch unit 110 includes a third transistor 123 and a fourth transistor 124, and a drain of the third transistor123 is connected to a drain of the fourth transistor 124. A source of the third transistor 123 is the third end 115 of the second switch unit 110, and is connected to the positive electrode 1091 of the second rectifier circuit 109. A source of the fourth transistor 124 is the fourth end 116 of the second switch unit 110. The third transistor 123 is connected in parallel to a third diode 125, the source of the third transistor 123 is connected to an anode of the third diode 125, and the drain of the third transistor 123 is connected to a cathode of the third diode 125. The fourth transistor 124 is connected in parallel to a fourth diode 126, the source of the fourth transistor 124 is connected to an anode of the fourth diode 126, and the drain of the fourth transistor 124 is connected to a cathode of the fourth diode 126.

The negative electrode 1062 of the first rectifier circuit 106 and the negative electrode 1092 of the second rectifier circuit 109 are conductive trace, so that an electrical loop is directly formed.

Based on the above connection manner, the first diode 121 connected in parallel to the first transistor 119 and the second diode 122 connected in parallel to the second transistor 120 may block the rectified voltage output when the first transistor 119 and the second transistor 120 are turned off, and the first diode 121 and the second diode 122 may also block a reverse current. The third diode 125 connected in parallel to the third transistor 123 and the fourth diode 126 connected in parallel to the fourth transistor 124 may block the rectified voltage output when the third transistor 123 and the fourth transistor 124 are turned off, and the third diode 125 and the fourth diode 126 may also block the reverse current.

In an embodiment of the present invention, the first transistor 119, the second transistor 120, the third transistor 123, and the fourth transistor 124 are MOS field effect transistors.

In an embodiment of the present invention, the first switch unit 107 is connected to the negative electrode 1062 of the first rectifier circuit 106, and the second switch unit 110 is connected to the negative electrode 1092 of the second rectifier circuit 109. The positive electrode 1061 of the first rectifier circuit 106 and the positive electrode 1091 of the second rectifier circuit 109 are conductive trace, so that the electrical loop is directly formed.

Figure 2B:
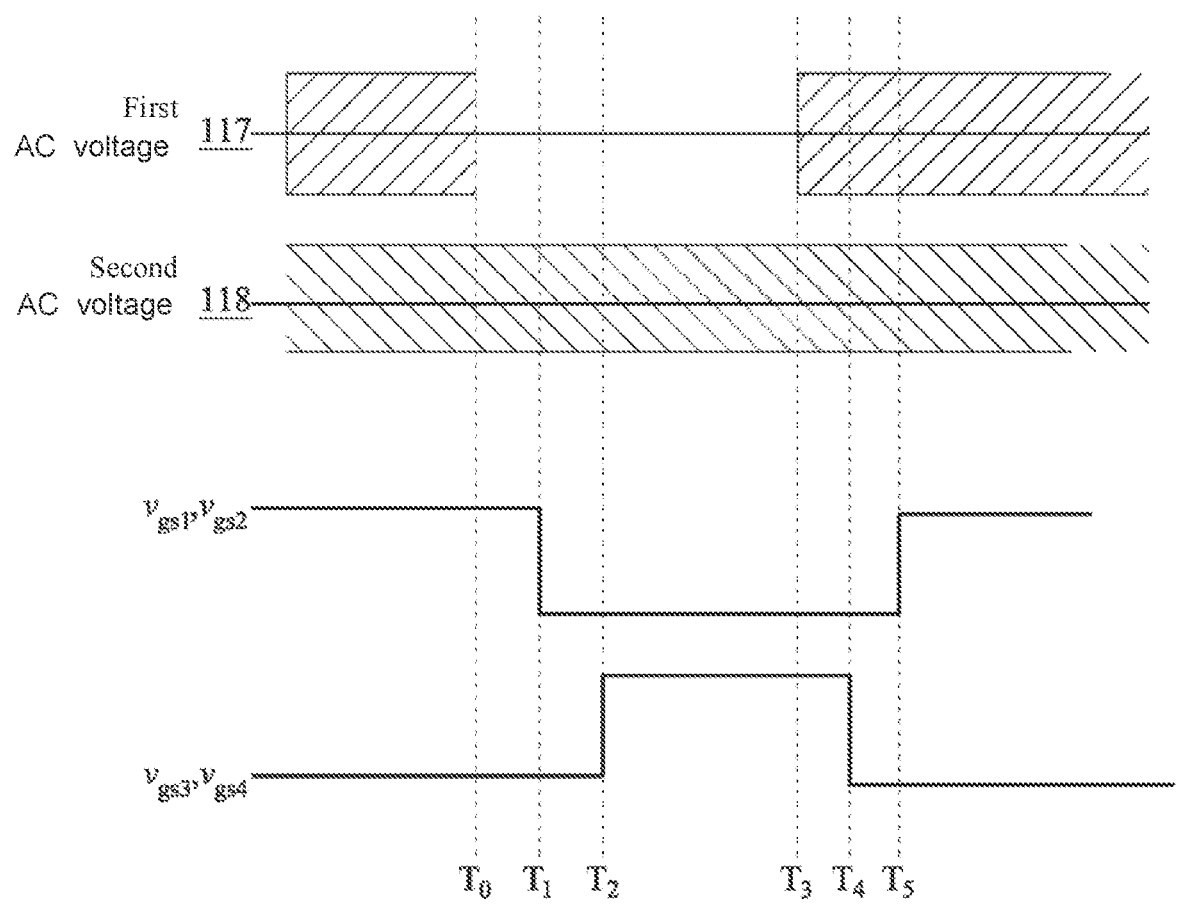
FIG. 2B illustrates a schematic operation diagram of a power supply management module according to an embodiment of the present invention.

FIG. 2B illustrates a schematic operation diagram of a power supply management module according to an embodiment of the present invention. Referring to FIG. 2A and FIG. 2B, $v_{gs1}$ represents a voltage between a gate and the source of the first transistor 119, $v_{gs2}$ represents a voltage between a gate and the source of the second transistor 120, $v_{gs3}$ represents a voltage between a gate and the source of the third transistor 123, and $v_{gs4}$ represents a voltage between a gate and the source of the fourth transistor 124. In this embodiment, before a time point $T_0$, power supply of the first AC voltage 117 and the second AC voltage 118 is normal. In this case, the switching control module 112 controls $v_{gs1}$ and $v_{gs2}$ to be at a high potential so that the first switch unit 107 is turned on, and the switching control module 112 controls $v_{gs3}$ and $v_{gs4}$ to be at a low potential so that the second switch unit 110 is turned off. The first AC voltage 117 provides energy required by the power supply module 102.

At the time point $T_0$, the detection unit 111 detects that the first alternating current input end 105 is abnormal, for example, no AC voltage is received or a voltage exceeds a normal range (in this embodiment, no AC voltage being received is used as an example to describe an operation manner). The detection unit 111 outputs the detection signal indicating that the first alternating current input end 105 does not receive the first AC voltage 117 from the outside. The switching control module 112 receives the detection signal, and controls, at a time point $T_1$, $v_{gs1}$ and $v_{gs2}$ to be at a low potential according to the detection signal so that the first switch unit 107 is turned off. At a time point $T_2$, the switching control module 112 controls $v_{gs3}$ and $v_{gs4}$ to be at a high potential so that the second switch unit 110 is turned on. In this case, the second AC voltage 118 provides the energy required by the power supply module 102. This period of time from the time point $T_1$ to the time point $T_2$ is a dead time, and a function of the dead time is to avoid line damage resulting from short circuit of the first AC voltage 117 and the second AC voltage 118 in the power supply management module 101.

From the time point $T_2$ to a time point $T_3$, the second AC voltage 118 provides the energy required by the power supply module 102. At the time point $T_3$, the detection unit 111 detects that the first alternating current input end 105 returns to normal, and receives an AC voltage from the outside. The detection unit 111 outputs the detection signal indicating that the first alternating current input end 105 receives the first AC voltage 117 from the outside. The switching control module 112 receives the detection signal, and controls, at a time point $T_4$, $v_{gs3}$ and $v_{gs4}$ to be at a low potential so that the second switch unit 110 is turned off. At a time point $T_5$, the switching control module 112 controls $v_{gs1}$ and $v_{gs2}$ to be at a high potential so that the first switch unit 107 is turned on. In this case, the first AC voltage 117 provides the energy required by the power supply module 102. This period of time from the time point $T_4$ to the time point $T_5$ is a dead time, and a function of the dead time is to avoid the line damage resulting from the short circuit of the first AC voltage 117 and the second AC voltage 118 in the power supply management module 101.

Figure 3:
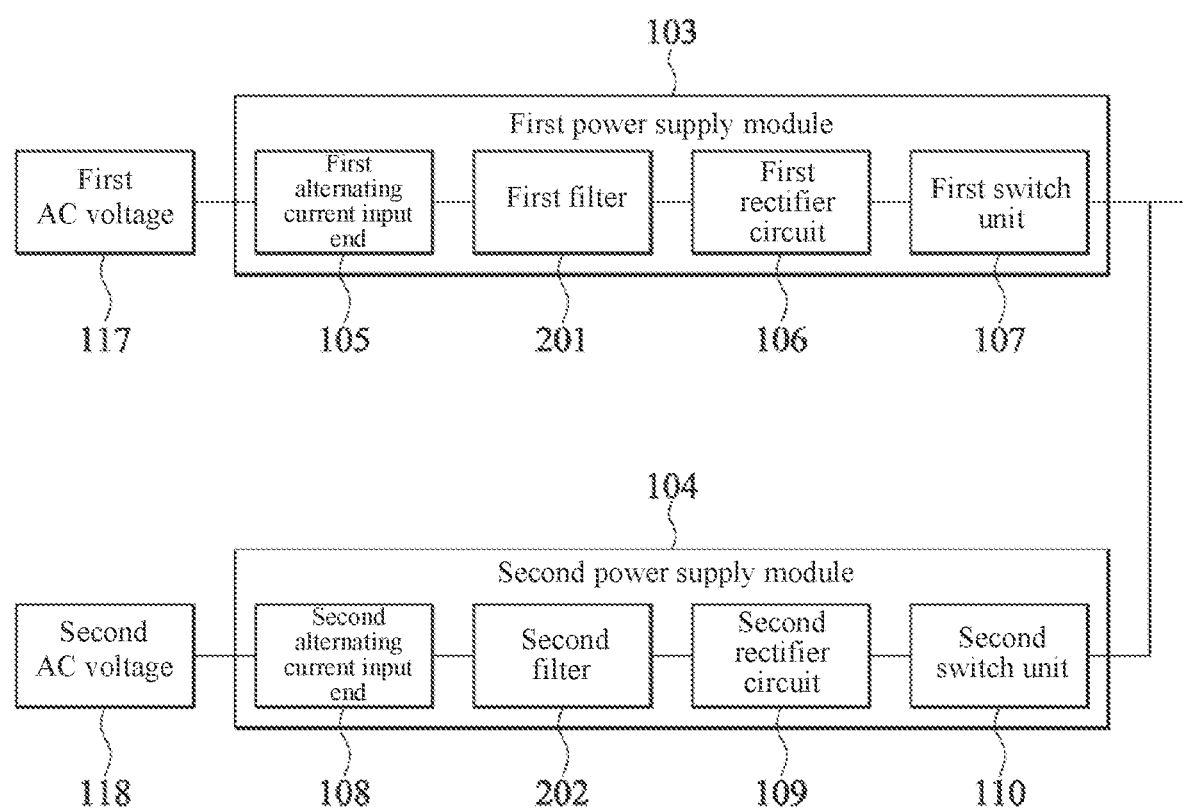
FIG. 3 illustrates a system block diagram of a first power supply module and a second power supply module according to an embodiment of the present invention.

FIG. 3 illustrates a system block diagram of a first power supply module and a second power supply module according to an embodiment of the present invention. Referring to FIG. 3, in this embodiment, the first power supply module 103 further includes a first filter 201, and the second power supply module 104 further includes a second filter 202. The first filter 201 is disposed between the first alternating current input end 105 and the first rectifier circuit 106, and the second filter 202 is disposed between the second alternating current input end 108 and the second rectifier circuit 109. The first filter 201 and the second filter 202 are respectively used to reduce electromagnetic interference of the first AC voltage 117 and electromagnetic interference of the second AC voltage 118. In this embodiment, the first filter 201 and the second filter 202 may be a passive filter or an active filter. This is not limited in the present invention.

Figure 4:
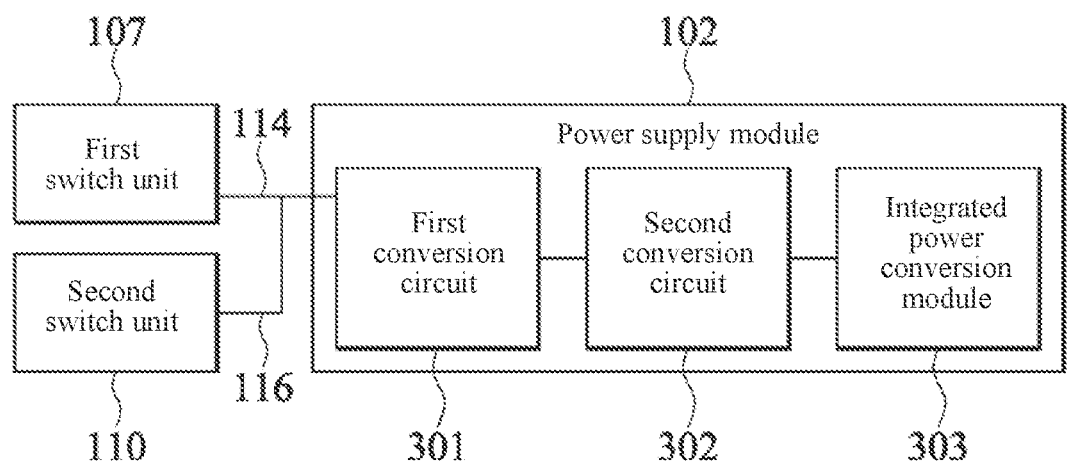
FIG. 4 illustrates a circuit block diagram of a power supply module according to an embodiment of the present invention.

FIG. 4 illustrates a circuit block diagram of a power supply module according to an embodiment of the present invention; Referring to FIG. 4, in this embodiment, the power supply module 102 includes a first conversion circuit 301, a second conversion circuit 302, and an integrated power conversion module 303. The first conversion circuit 301 is connected to the second end 114 of the first switch unit 107 and the fourth end 116 of the second switch unit 110. The first conversion circuit 301 is configured to convert the rectified voltage into a direct current high voltage and adjust a power factor of the direct current high voltage. In this embodiment, the first conversion circuit 301 may be a passive power factor correction circuit, an active power factor correction circuit, or a dynamic power factor correction circuit. This is not limited in the present invention. The second conversion circuit 302 is connected to the first conversion circuit 301, and is configured to adjust the direct current high voltage output by the first conversion circuit 301. In this embodiment, the second conversion circuit 302 may be an LLC resonant converter or a phase shift full bridge converter.

Figure 5A:
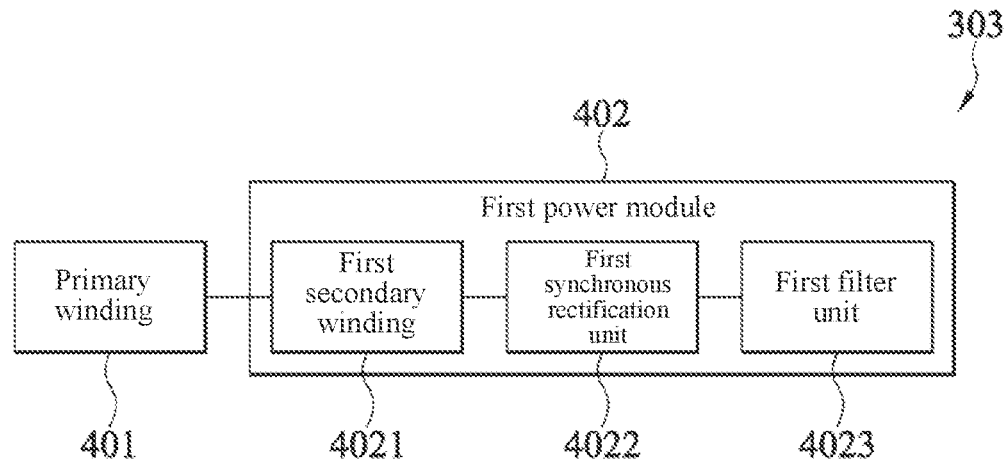
FIG. 5A illustrates a circuit block diagram of an integrated power conversion module according to an embodiment of the present invention.
Figure 5B:
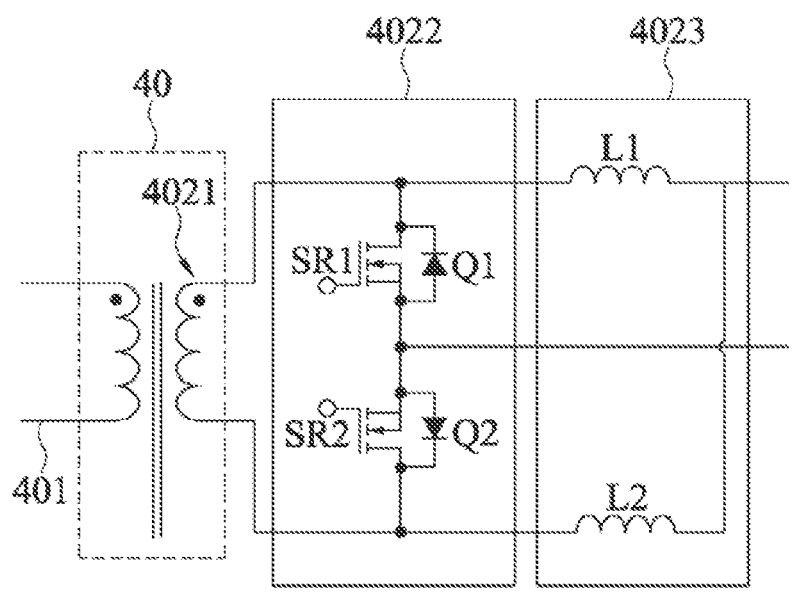
FIG. 5B illustrates a circuit diagram of the integrated power conversion module according to this embodiment of the present invention.

FIG. 5A illustrates a circuit block diagram of an integrated power conversion module according to an embodiment of the present invention. FIG. 5B illustrates a circuit diagram of the integrated power conversion module according to this embodiment of the present invention. Referring to both FIG. 5A and FIG. 5B, in this embodiment, the integrated power conversion module 303 includes a primary winding 401 and a first power module 402. The first power module 402 includes a first secondary winding 4021, a first synchronous rectification unit 4022, and a first filter unit 4023. The integrated power conversion module 303 includes a transformer 40, and the transformer 40 includes the primary winding 401 and the first secondary winding 4021. The first synchronous rectification unit 4022 includes a transistor switch Q1 and a transistor switch Q2. A source of the transistor switch Q1 is connected to a source of the transistor switch Q2, a drain of the transistor switch Q1 is connected to one end of the first secondary winding 4021, and a drain of the transistor switch Q2 is connected to the other end of the first secondary winding 4021. A gate SR1 of the transistor switch Q1 and a gate SR2 of the transistor switch Q2 may receive a control voltage to control on and off of the transistor switch Q1 and the transistor switch Q2. The first filter unit 4023 includes an inductor L1 and an inductor L2, the drain of the transistor switch Q1 is connected to the inductor L1, and the drain of the transistor switch Q2 is connected to the inductor L2.

Figure 6:
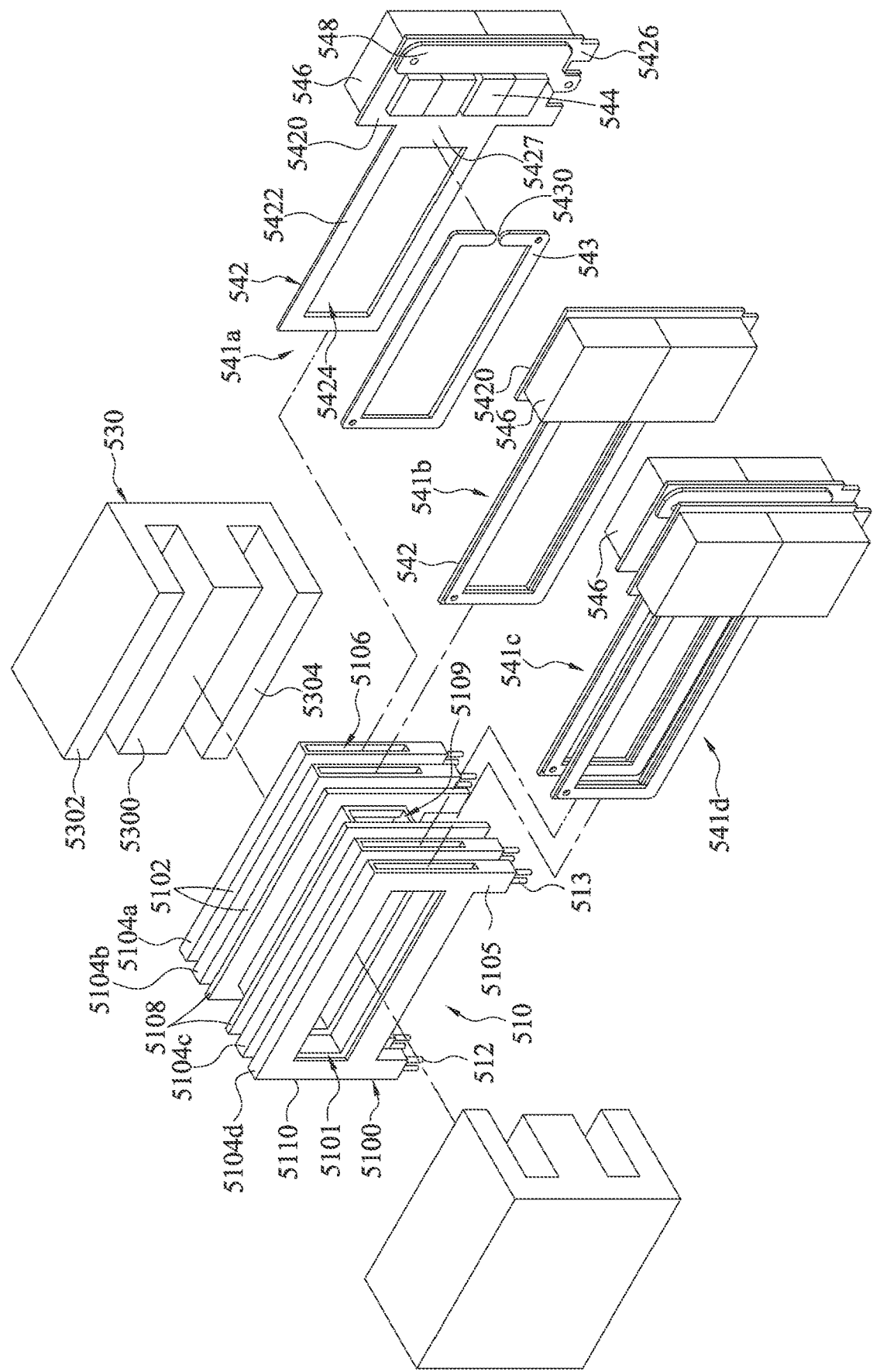
FIG. 6 illustrates a three-dimensional exploded view of the integrated power conversion module according to this embodiment of the present invention.
Figure 7:
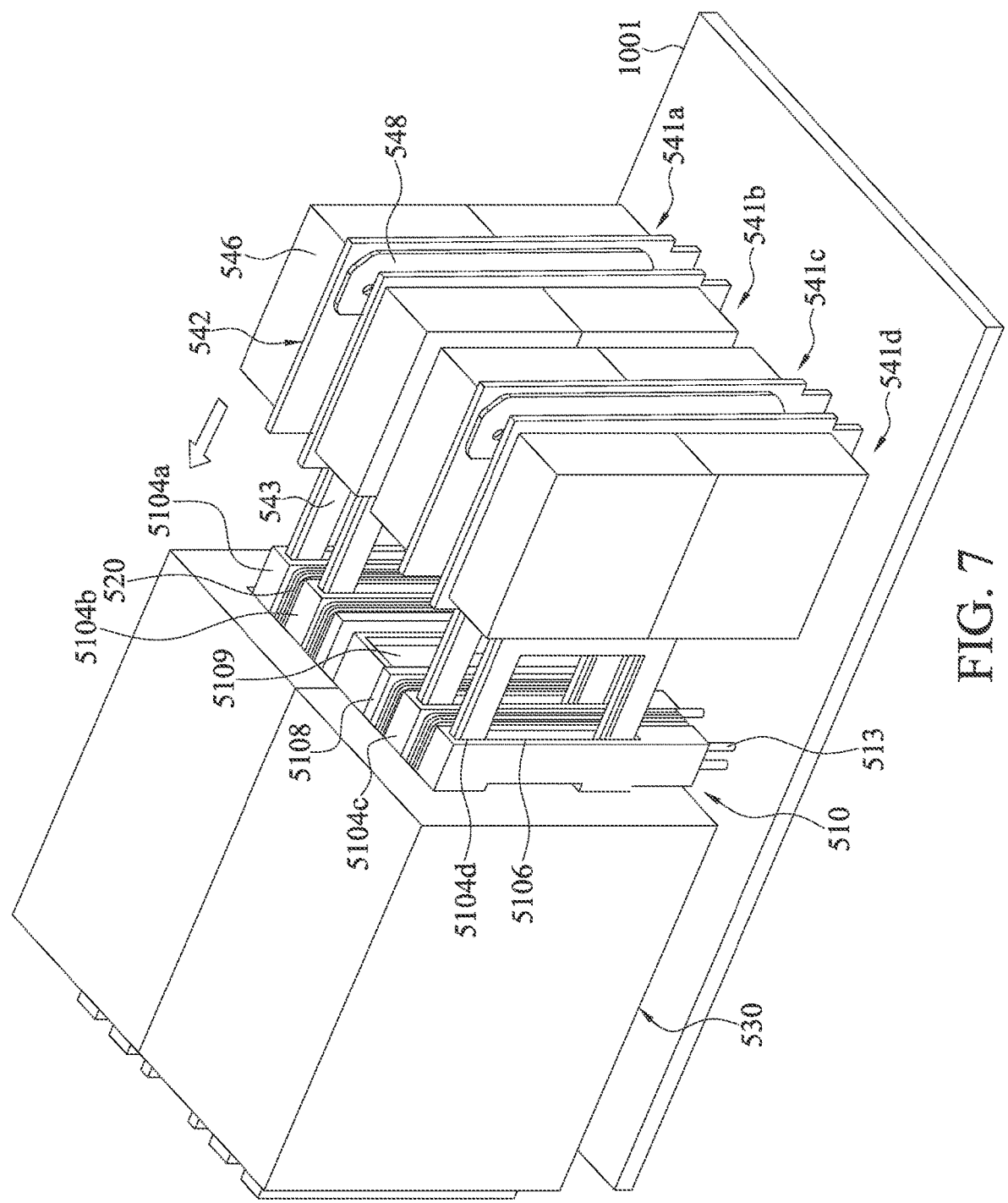
FIG. 7 illustrates a partial combination diagram of the integrated power conversion module according to this embodiment of the present invention.
Figure 8:
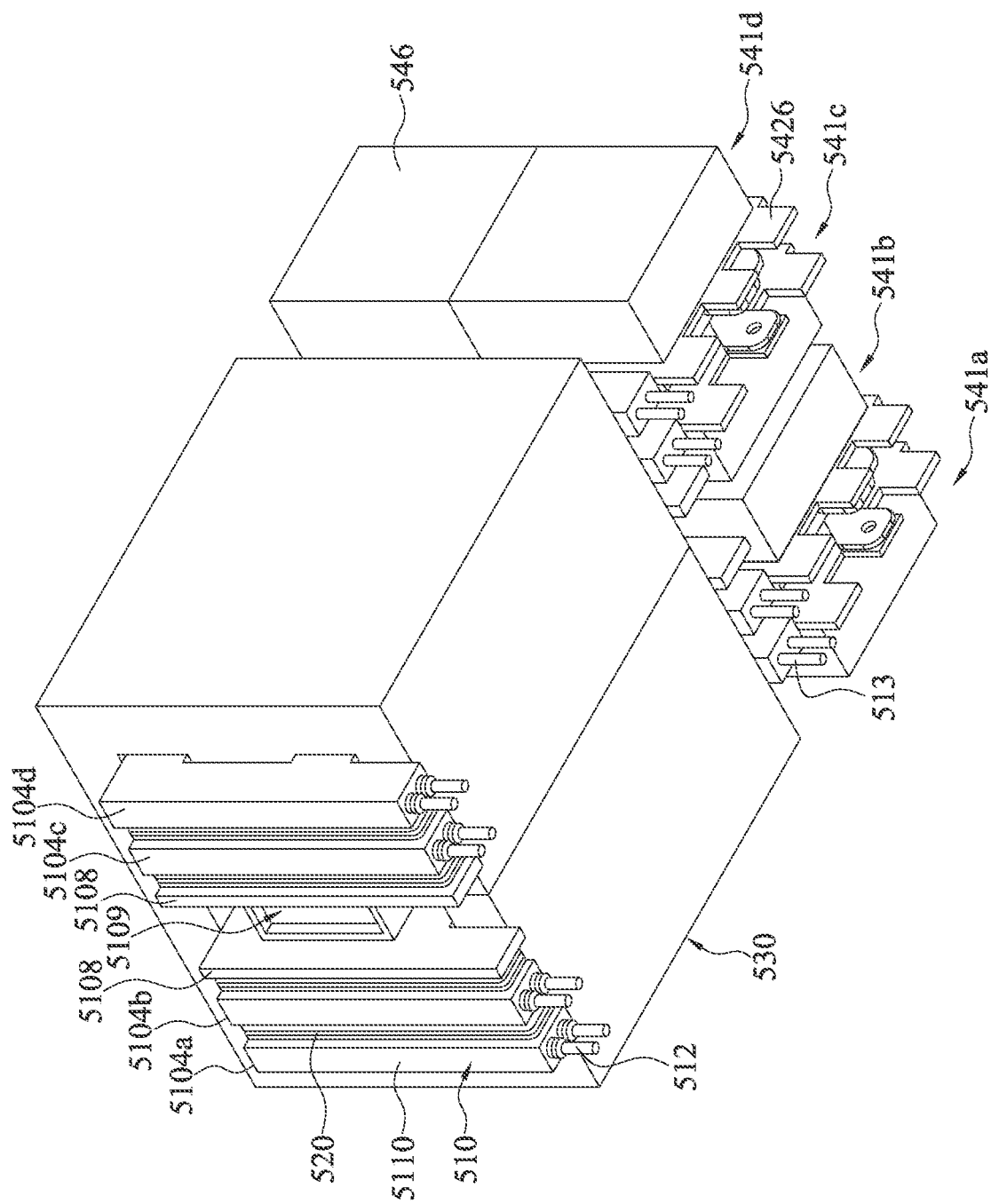
FIG. 8 illustrates a combination diagram of the integrated power conversion module according to this embodiment of the present invention.

FIG. 6 illustrates a three-dimensional exploded view of the integrated power conversion module according to this embodiment of the present invention, FIG. 7 illustrates a partial combination diagram of the integrated power conversion module according to this embodiment of the present invention, and FIG. 8 illustrates a combination diagram of the integrated power conversion module according to this embodiment of the present invention. Referring to FIG. 5A, FIG. 5B, FIG. 6, FIG. 7, and FIG. 8 together, the integrated power conversion module 303 of this embodiment includes a bobbin 510, at least one primary winding 520, an iron core component 530, and a plurality of power modules 541a-541d. The primary winding 520 is an implementation of the primary winding 401, and the power module 541a is an implementation of the first power module 402. Structures of the components of the integrated power conversion module 303 are described in detail below.

The bobbin 510 includes a main body 5100, a plurality of winding portions 5102, and a plurality of receiving portions 5104a-5104d. The receiving portions 5104a-5104d are arranged in parallel with each other. Quantities of the winding portions 5102 and the receiving portions 5104a-5104d are corresponding and arranged on the main body 5100 in a staggered manner.

The main body 5100 further includes a first channel 5101 and a second channel 5109. The second channel 5109 is in communication with the first channel 5101, and is approximately perpendicular to the first channel 5101.

In this embodiment, the bobbin 510 includes four receiving portions 5104a-5104d that are respectively disposed at two opposite sides of the second channel 5109, wherein the receiving portions 5104a and 5104b are located at one side of the second channel 5109, and the receiving portions 5104c and 5104d are located at the other side of the second channel 5109. The winding portions 5102 are also respectively disposed at the two sides of the second channel 5109, and are arranged with the receiving portions 5104a-5104d in a staggered manner.

A groove 5106 is formed at one side edge of the receiving portions 5104a-5104d close to the power modules 541a and 541b, and the groove 5106 is in communication with the first channel 5101. A side wall 5110 is formed at the other side edge of the receiving portions 5104a-5104d away from the power modules 541a and 541b, wherein the side wall 5110 closes the groove 5106.

Bottom ends of two sides of the receiving portions 5104a-5104d extend downward to form bumps 5105, and extension directions of the bumps 5105 are approximately perpendicular to an opening direction of the groove 5106. A plurality of conductive terminals 512 are respectively connected to the bumps 5105 at one side of the receiving portions 5104a-5104d away from the power modules 541a-541d, and a plurality of fixing members 513 are respectively connected to the bumps 5105 at one side of the receiving portions 5104a-5104d close to the power modules 541a-541d.

As shown in FIG. 7, the primary winding 520 is electrically connected to the conductive terminals 512, and is wound around the winding portion 5102 in an S-shaped winding manner by using one of the conductive terminals 512 as a start point, and another one of the conductive terminals 512 as an end point. As mentioned above, the primary winding 520 is an implementation of the primary winding 401 of the integrated power conversion module 303.

The main body 5100 further includes a plurality of spacers 5108. The spacers 5108 are respectively disposed between the second channel 5109 and the two receiving portions 5104b and 5104c closest to the second channel 5109, and are used to separate the second channel 5109 and the receiving portions 5104b and 5104c.

The iron core component 530 is sleeved outside the bobbin 510, and is partially inserted in the first channel 5101. The iron core component 530 may be composed of two E-shaped iron cores, and each E-shaped iron core includes a center post 5300, and side posts 5302 and 5304 located at two opposite sides of the center post 5300 and connected to the center post 5300. When the iron core component 530 is sleeved on the bobbin 510, the side posts 5302 and 5304 are respectively located at an upper side and a lower side of the bobbin 510, and two side posts of the two E-shaped iron cores respectively abut against each other. The center post 5300 is inserted in the first channel 5101, there is an air gap between the center posts 5300 of the two E-shaped iron cores, and the air gap is formed in the second channel 5109, to achieve an energy storage effect. It should be particularly noted herein that, the primary winding 520 is not wound on a position at which the main body 5100 is located in the second channel 5109. Because the primary windings 520 avoid the air gap, an eddy current loss can be effectively reduced.

In addition, when the iron core component 530 is sleeved on the bobbin 510, there are air channels (not shown in the figure) between the side posts 5302 and 5304 of the iron core component 530 and the main body 5100 as well as the primary winding 520 wound around the winding portion 5102, and may be used for air circulation, to provide a good heat dissipation effect.

In an application embodiment of a plurality of power modules, for example, the power modules 541a and 541b are disposed in parallel, and the power modules 541c and 541d are disposed in parallel. The power modules 541a-541d are arranged in a parallel manner. Each of the power modules 541a-541d includes a circuit board 542, a synchronous rectification unit 544, and a filter unit 546. The synchronous rectification unit 544 of the power module 541a is an implementation of the first synchronous rectification unit 4022, and the filter unit 546 of the power module 541a is an implementation of the first filter unit 4023.

It should be noted that, in the present invention, a single power module 541a may be alternatively disposed, and the present invention is not limited by disposing a plurality of power modules.

The circuit board 542 includes a placement portion 5420 and a sensing portion 5422 connected to the placement portion 5420. A copper clad line (not shown in the figure) is disposed on the placement portion 5420 and the sensing portion 5422 in advance, for a conductive sheet 543, the synchronous rectification unit 544, and the filter unit 546 to be electrically connected. A shape of the placement portion 5420 is approximately rectangular, and an end 5426 is disposed on a bottom edge of the placement portion 5420. An end 5427 is disposed on a side edge of the placement portion 5420, and is connected to the sensing portion 5422.

The sensing portion 5422 has a center hole 5424, and a shape of the sensing portion 5422 is annular. A shape of the copper clad line formed on the sensing portion 5422 may approximately be annular, and the copper clad line may transmit a current to the synchronous rectification unit 544. A shape of the sensing portion 5422 corresponds to shapes of the receiving portions 5104a-5104d, and when the sensing portion 5422 is inserted in the groove 5106, the center hole 5424 corresponds to and is in communication with the first channel 5101.

Each of the power modules 541a-541d may further include a conductive sheet 543 attached on the copper clad line of the sensing portion 5422. A shape of the conductive sheet 543 approximately corresponds to the sensing portion 5422, and the conductive sheet 543 has a notch 5430 so that the shape of the conductive sheet 543 is approximately C-shaped. For example, the conductive sheet 543 may (but not limited to) be made of a tinned copper sheet, to provide and enhance conductive and thermal conduction effects of the sensing portion 5422.

In the integrated power conversion module 303 of this embodiment, the primary winding 520 wound around the winding portion 5102, the iron core component 530 sleeved on the bobbin 510, the sensing portion 5422 inserted in the groove 5106 of the bobbin 510, and the conductive sheet 543 compose an implementation of the transformer 40 illustrated in FIG. 5B.

The synchronous rectification unit 544 is disposed at one side surface of the placement portion 5420 of the circuit board 542, and the filter unit 546 is disposed at the other side surface of the placement portion 5420 of the circuit board 542. For example, the synchronous rectification unit 544 may be a synchronous rectifier circuit composed of four metal-oxide semiconductor (MOS) field effect transistors, wherein the synchronous rectifier circuit can effectively reduce a rectification loss. For example, the synchronous rectification unit 544 may also be the first synchronous rectification unit 4022 illustrated in FIG. 5B. The power modules 541a-541d further include a conductive board 548 disposed on the placement portion 5420, and the conductive board 548 is located at the same side surface with the synchronous rectification unit 544. For example, the filter unit 546 may be an inductor.

In addition, a surface of the circuit board 542 of the power module 541b on which the filter unit 546 is disposed faces a surface of the circuit board 542 of the power module 541c on which the filter unit 546 is disposed. In other words, the filter units 546 of the two power modules 541b and 541c that are located at two sides of the second channel 5109 and are closest to the second channel 5109 face each other.

In addition, a surface of the circuit board 542 of the power module 541a on which the synchronous rectification unit 544 is disposed faces a surface of the circuit board 542 of the power module 541b on which the synchronous rectification unit 544 (not shown in the figure) is disposed. In other words, the synchronous rectification units 544 of the adjacent two power modules 541a and 541b (or 541c and 541d) located at any side of the second channel 5109 are disposed opposite. In this way, the integrated power conversion module 303 can achieve a compact configuration, which can effectively reduce an overall volume.

The integrated power conversion module 303 of this embodiment can use the circuit configuration of FIG. 5B to match a structural configuration shown in FIG. 6 to FIG. 8, to achieve a miniaturization feature and effectively reduce an eddy current loss and a switching loss.

Because the integrated power conversion module 303 of this embodiment can achieve the miniaturization feature, the integrated power conversion module 303 may be disposed on the main circuit board 1001. In this embodiment, the integrated power conversion module 303 is disposed on the main circuit board 1001, and the main circuit board 1001 is disposed at the bottom of the integrated power conversion module 303 (as shown in FIG. 7). The fixing members 513 are used to support the integrated power conversion module 303 on the main circuit board 1001, to prevent the integrated power conversion module 303 from tilting due to a heavy weight of the power modules 541a and 541b. It should be particularly noted herein that: if the fixing members 513 and the conductive terminals 512 are disposed on the bobbin 510, the conductive terminals 512 may be disposed at bottom ends of the receiving portions 5104a-5104d, and the primary winding 520 is connected to the conductive terminals 512, and is electrically connected to the main circuit board 1001 through the conductive terminals 512. The fixing members 513 are disposed at bottom ends of the receiving portions 5104a-5104d at which the conductive terminals 512 are not disposed, so that the integrated power conversion module 303 is supported on the main circuit board 1001. If the primary winding 520 wound on the bobbin 510 is directly connected to the main circuit board 1001 (that is, in a fly line connection manner), only the fixing members 513 may be disposed at the bottom ends of the receiving portions 5104a-5104d. Configuration manners and quantities of the conductive terminals 512 and the fixing members 513 may be adjusted according to actual needs.

It is worth mentioning that, as mentioned above, after the first alternating current input end 105 or the second alternating current input end 108 receives the external AC voltage, the power supply device 100 shown in FIG. 1 rectifies the external AC voltage into the lower-voltage direct current through the rectifier circuit, which can reduce the overall volume, so that the power supply device 100 is adapted to be integrated on the single main circuit board 1001. Therefore, in an embodiment, the power supply device 100 entirely includes the first power supply module 103, the second power supply module 104, the detection unit 111, the switching control module 112, the first conversion circuit 301, the second conversion circuit 302, and the integrated power conversion module 303, which are disposed on the single main circuit board 1001.

The integrated power conversion module 303 of this embodiment may be used for providing a plurality of groups of direct currents for subsequent integration (for details, refer to the description of FIG. 9A and FIG. 9B below), and the secondary winding (the copper clad line and the conductive sheet 543 formed on the sensing portion 5422), the synchronous rectification unit 544, and the filter unit 546 are integrated on the circuit boards 542 and are in combination with the bobbin 510 in a plug-in manner. Therefore, the integrated power conversion module 303 has features such as easy to assembly and production, and a small volume. It should be noted that, the secondary winding of the copper clad line and the conductive sheet 543 formed on the sensing portion 5422 on the power module 541a is an implementation of the first secondary winding 4021.

Figure 9A:
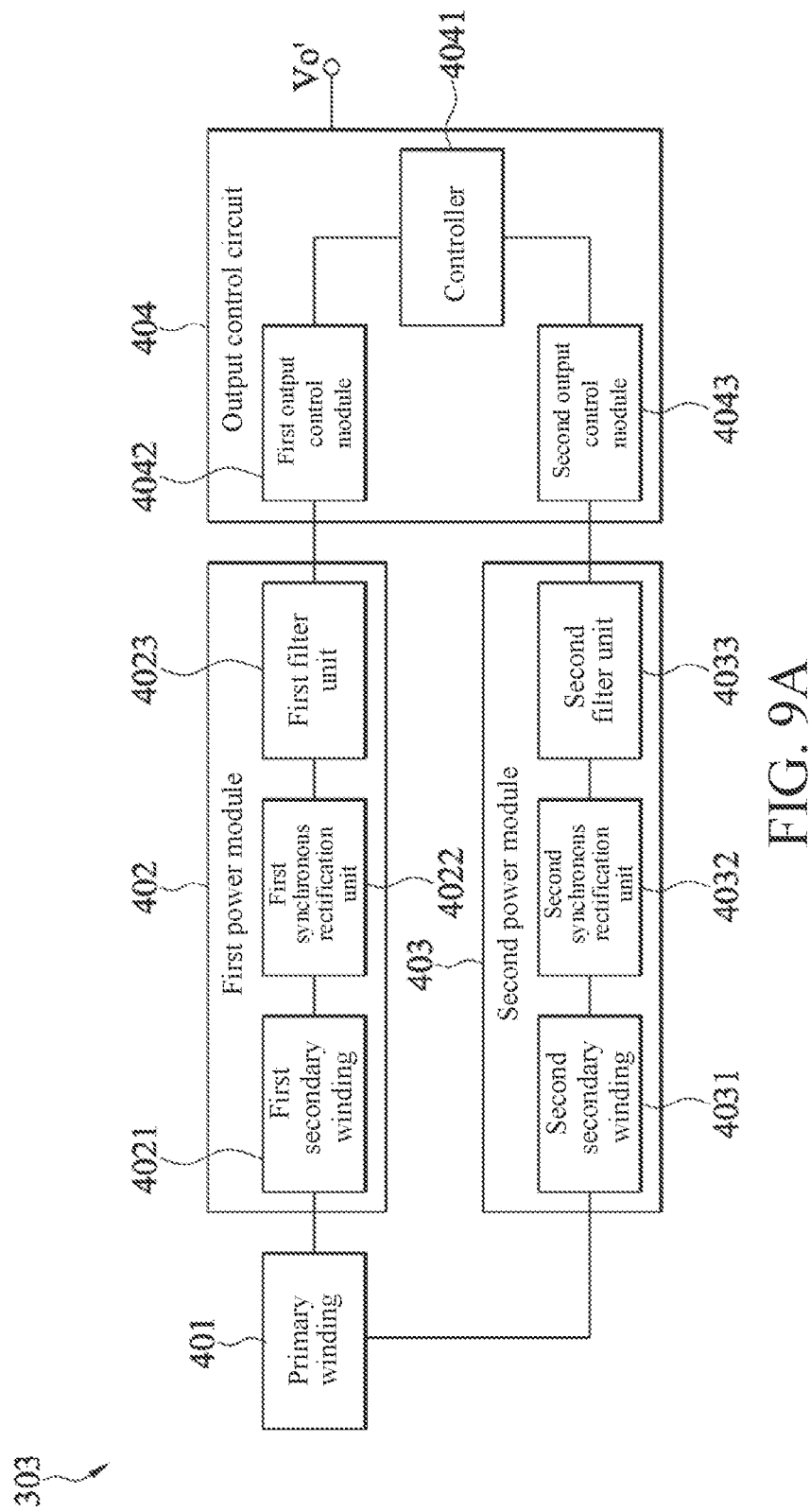
FIG. 9A illustrates a circuit block diagram of an integrated power conversion module according to an embodiment of the present invention.
Figure 9B:
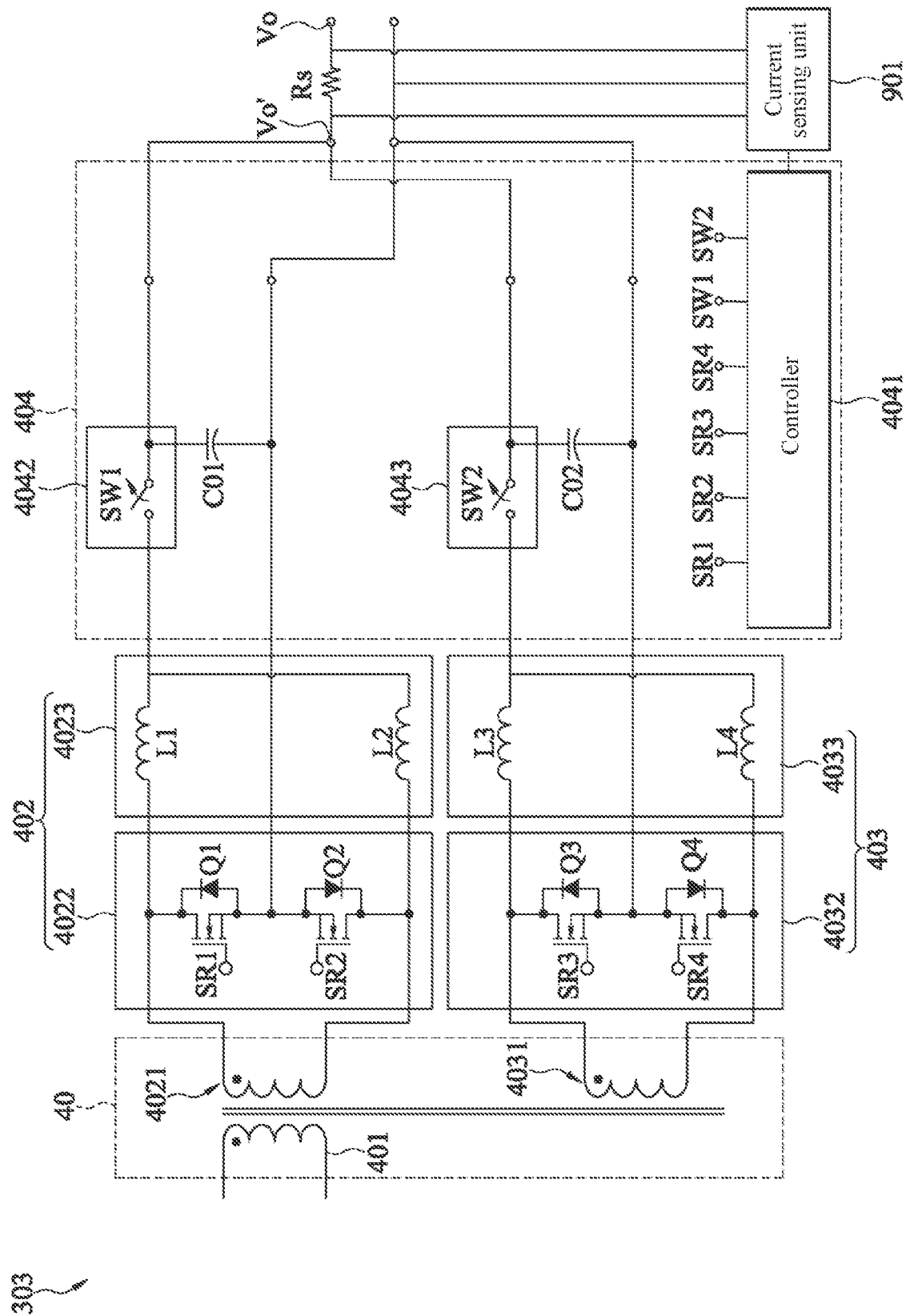
FIG. 9B illustrates a circuit diagram of the integrated power conversion module according to this embodiment of the present invention.

FIG. 9A illustrates a circuit block diagram of an integrated power conversion module according to an embodiment of the present invention. FIG. 9B illustrates a circuit diagram of the integrated power conversion module according to this embodiment of the present invention. Referring to FIG. 6, FIG. 7, FIG. 8, FIG. 9A, and FIG. 9B together, the circuit block diagram of the integrated power conversion module 303 of this embodiment further includes a second power module 403 and an output control circuit 404 compared with FIG. 5A. The second power module 403 and the first power module 402 have the same structure. The second power module 403 includes a second secondary winding 4031, a second synchronous rectification unit 4032, and a second filter unit 4033. The integrated power conversion module 303 includes a transformer 40. In this embodiment, the transformer 40 includes the primary winding 401, the first secondary winding 4021, and the second secondary winding 4031. The second synchronous rectification unit 4032 includes a transistor switch Q3 and a transistor switch Q4. A source of the transistor switch Q3 is connected to a source of the transistor switch Q4, a drain of the transistor switch Q3 is connected to one end of the second secondary winding 4031, and a drain of the transistor switch Q4 is connected to the other end of the second secondary winding 4031. A gate SR3 of the transistor switch Q3 and a gate SR4 of the transistor switch Q4 may receive a control voltage to control on and off of the transistor switch Q3 and the transistor switch Q4. The second filter unit 4033 includes an inductor L3 and an inductor L4, the drain of the transistor switch Q3 is connected to the inductor L3, and the drain of the transistor switch Q4 is connected to the inductor L4.

It should be noted that, in this embodiment, the output control circuit 404 is disposed on the main circuit board 1001. The primary winding 401 is implemented as the primary winding 520 in FIG. 7, and the first power module 402 and the second power module 403 are respectively implemented as the power module 541a and the power module 541b in FIG. 6, FIG. 7, and FIG. 8. The first secondary winding 4021 is implemented as the secondary winding of the copper clad line and the conductive sheet 543 formed on the sensing portion 5422 on the power module 541a, and the second secondary winding 4031 is implemented as the secondary winding of the copper clad line and the conductive sheet 543 formed on the sensing portion 5422 on the power module 541b. The first synchronous rectification unit 4022 is implemented as the synchronous rectification unit 544 of the power module 541a, and the first filter unit 4023 is implemented as the filter unit 546 of the power module 541a. The second synchronous rectification unit 4032 is implemented as the synchronous rectification unit 544 of the power module 541b, and the second filter unit 4033 is implemented as the filter unit 546 of the power module 541b. In this embodiment, the first power module 402 (implemented as the power module 541a in FIG. 6, FIG. 7, and FIG. 8) and the second power module 403 (implemented as the power module 541b in FIG. 6, FIG. 7, and FIG. 8) are correspondingly disposed in different grooves 5106 of the main body 5100, to sense the primary winding 401 (implemented as the primary winding 520 in FIG. 7). As shown in FIG. 9B, an output end of the first power module 402 (implemented as the power module 541a in FIG. 6, FIG. 7, and FIG. 8) is connected in parallel to an output end of the second power module 403 (implemented as the power module 541b in FIG. 6, FIG. 7, and FIG. 8).

The output control circuit 404 includes a controller 4041 and a first output control module 4042 and a second output control module 4043 connected to the controller 4041. The first output control module 4042 is configured to control on and off of power output of the first power module 402, and the second output control module 4043 is configured to control on and off of power output of the second power module 403. As shown in FIG. 9B, in this embodiment, the first output control module 4042 includes a first output switch SW1, and the second output control module 4043 includes a second output switch SW2.

The output control circuit 404 further includes output capacitors C01 and C02, a power output end Vo', a sensing resistor Rs, a power supply output end Vo, and a current sensing unit 901. The power supply module 102 is configured to provide different power to meet power required by an electronic device, the controller 4041 receives a current sensing signal that represents a current flowing through the sensing resistor Rs and that is sent from the current sensing unit 901, to measure the power required by the electronic device. According to the measured power required by the electronic device, by being connected to the gate SR1 of the transistor switch Q1, the gate SR2 of the transistor switch Q2, the gate SR3 of the transistor switch Q3, and the gate SR4 of the transistor switch Q4, the first output switch SW1, and the second output switch SW2, the controller 4041 sets at least one of the first synchronous rectification unit 4022 and the second synchronous rectification unit 4032 or at least one of the first output switch SW1 and the second output switch SW2 to be in an on-state, to transmit the power required by the electronic device to the electronic device. When the first synchronous rectification unit 4022 and the second synchronous rectification unit 4032 are in the on-state, electric energy coupled to the first secondary winding 4021 and the second secondary winding 4031 is transferred to the first synchronous rectification unit 4022 and the second synchronous rectification unit 4032, and a synchronous rectification procedure is performed. On the contrary, when the first synchronous rectification unit 4022 and the second synchronous rectification unit 4032 are not in the on-state, electric energy transmitted to the primary winding 401 cannot be transferred to the first secondary winding 4021 and the second secondary winding 4031, and the synchronous rectification procedure is not performed. In addition, when the first output switch SW1 and the second output switch SW2 are in the on-state, the first output switch SW1 and the second output switch SW2 are turned on, and electric energy after synchronous rectification is transferred to the output capacitors C01 and C02, the power output end Vo', and the power supply output end Vo. On the contrary, when the first output switch SW1 and the second output switch SW2 are not in the on-state, the first output switch SW1 and the second output switch SW2 are turned off, and the electric energy after the synchronous rectification cannot be transferred to the output capacitors C01 and C02, the power output end Vo', and the power supply output end Vo.

In this embodiment, the output control circuit 404 is disposed on the main circuit board 1001, and is connected to the first power module 402 and the second power module 403 through a line on the main circuit board 1001. The output control circuit 404 is also connected to the switching control module 112 in the power supply management module 101 through the line on the main circuit board 1001 for communication. The controller 4041 is connected to the gates SR1 and SR2 of the first synchronous rectification unit 4022 (implemented as the synchronous rectification unit 544 of the power module 541a shown in FIG. 6) through the end 5426 disposed at the bottom edge of the first placement portion (implemented as the placement portion 5420 of the power module 541a shown in FIG. 6) of the first power module 402 (implemented as the power module 541a shown in FIG. 6). The controller 4041 is connected to the gates SR3 and SR4 of the second synchronous rectification unit 4032 (implemented as the synchronous rectification unit 544 of the power module 541b) through the end 5426 disposed at the bottom edge of the second placement portion (implemented as the placement portion 5420 of the power module 541b shown in FIG. 6) of the second power module 403 (implemented as the power module 541b shown in FIG. 6).

Based on the above, according to the power supply management module and the power supply management method provided by the embodiments of the present invention, after the first alternating current input end or the second alternating current input end receives an external AC voltage, the rectifier circuit rectifies the external AC voltage into a lower-voltage direct current, which can make subsequent processing circuit components bear a lower voltage or components with a lower rated withstand voltage be selected. The integrated power conversion module of the power supply device provided by the embodiments of the present invention has features such as a simple structure and a small volume. The advantages of the above embodiments can reduce an overall volume of the power supply device, so that the power supply device is adapted to be integrated on the single main circuit board 1001.

What is claimed is:
1. A power supply device, comprising:
a power supply management module, outputting a rectified voltage; and
a power supply module, receiving the rectified voltage and outputting a conversion voltage, wherein
the power supply management module comprises:
a first power supply module, comprising: a first alternating current input end, receiving a first AC voltage; a first rectifier circuit, rectifying the first AC voltage; and a first switch unit, comprising a first end and a second end, the first end being connected to the first rectifier circuit;
a second power supply module, comprising: a second alternating current input end, receiving a second AC voltage; a second rectifier circuit, rectifying the second AC voltage; and a second switch unit, comprising a third end and a fourth end, wherein the third end is connected to the second rectifier circuit, and the fourth end is connected to the second end of the first switch unit;

a detection unit, detecting the first alternating current input end and the second alternating current input end, and outputting a detection signal; and
a switching control module, receiving the detection signal, and controlling on and off of the first switch unit and the second switch unit according to the detection signal, so that one of the first power supply module and the second power supply module outputs the rectified voltage, wherein the first switch unit comprises a first transistor and a second transistor, a drain of the first transistor is connected to a drain of the second transistor, a source of the first transistor is the first end of the first switch unit, and a source of the second transistor is the second end of the first switch unit; and the second switch unit comprises a third transistor and a fourth transistor, a drain of the third transistor is connected to a drain of the fourth transistor, a source of the third transistor is the third end of the second switch unit, and a source of the fourth transistor is the fourth end of the second switch unit, wherein the source of the first transistor is connected to an anode of a first diode, the drain of the first transistor is connected to a cathode of the first diode, the source of the second transistor is connected to an anode of a second diode, and the drain of the second transistor is connected to a cathode of the second diode, to block the rectified voltage output when both the first transistor and the second transistor are turned off.

2. The power supply device according to claim 1, wherein the power supply module comprises:
a first conversion circuit, connected to the second end of the first switch unit and the fourth end of the second switch unit, wherein the first conversion circuit is configured to convert the rectified voltage into a direct current high voltage and adjust a power factor of the direct current high voltage;
a second conversion circuit, connected to the first conversion circuit, and configured to adjust the direct current high voltage; and
an integrated power conversion module, comprising:
a primary winding, connected to the second conversion circuit, and receiving the direct current high voltage after adjusted;
a first power module, being a detachable module that is pluggable or configurable, wherein the first power module comprises a first circuit board, the first circuit board comprises a first placement portion and a first sensing portion, the first placement portion comprises a fifth end and a sixth end, the fifth end is connected to the first sensing portion, the sixth end is electrically connected to a main circuit board, and the first sensing portion comprises a first center hole, wherein a first secondary winding is disposed on the first sensing portion, and a first synchronous rectification unit is disposed on the first circuit board and receives a first output voltage of the first secondary winding; and
an iron core, inserted in the first center hole.

3. The power supply device according to claim 2, wherein the first power supply module, the second power supply module, the detection unit, the switching control module, the first conversion circuit, and the second conversion circuit are all disposed on the main circuit board.

4. The power supply device according to claim 2, wherein the second conversion circuit is an LLC resonant converter.

5. The power supply device according to claim 2, wherein the second conversion circuit is a phase shift full bridge converter.

6. The power supply device according to claim 2, wherein the power supply module further comprises a second power module, the second power module is a detachable module that is pluggable or configurable, the second power module comprises a second circuit board, the second circuit board comprises a second placement portion and a second sensing portion, the second placement portion comprises a seventh end and an eighth end, the seventh end is connected to the second sensing portion, the eighth end is connected to the main circuit board, and the second sensing portion comprises a second center hole, wherein a second secondary winding is disposed on the second sensing portion, and a second synchronous rectification unit is disposed on the second circuit board and receiving a second output voltage of the second secondary winding; and the first power module and the second power module are disposed on different sides of the primary winding, and an output end of the first power module is connected in parallel to an output end of the second power module.

7. The power supply device according to claim 6, wherein the power supply module further comprises an output control circuit disposed on the main circuit board, the output control circuit is connected to a power output end, and the output control circuit is connected to the first synchronous rectification unit through the first placement portion, and is connected to the second synchronous rectification unit through the second placement portion.

8. The power supply device according to claim 7, wherein the output control circuit comprises a controller, and a first output control module and a second output control module connected to the controller, the first output control module is configured to control on and off of the first power module, and the second output control module is configured to control on and off of the second power module.

9. The power supply device according to claim 8, wherein the first output control module comprises a first output switch, configured to control the on and off of the first power module; and the second output control module comprises a second output switch, configured to control the on and off of the second power module.

10. The power supply device according to claim 1, wherein, in response to the detection signal indicating that the first alternating current input end receives the first AC voltage, the switching control module controls the first switch unit to be turned on, and controls the second switch unit to be turned off; and in response to the detection signal indicating that the first alternating current input end does not receive the first AC voltage and the second alternating current input end receives the second AC voltage, the switching control module controls the first switch unit to be turned off, and controls the second switch unit to be turned on.

11. The power supply device according to claim 1, wherein an output end of the first rectifier circuit comprises a positive electrode and a negative electrode, and in response to the first switch unit being connected to the positive electrode of the output end of the first rectifier circuit, the negative electrode of the output end of the first rectifier circuit is a conductive trace, so that an electrical loop is directly formed; and in response to the first switch unit being connected to the negative electrode of the output end of the first rectifier circuit, the positive electrode of the output end of the first rectifier circuit is a conductive trace, so that the electrical loop is directly formed.

12. The power supply device according to claim 1, wherein the first power supply module further comprises a first filter disposed between the first alternating current input end and the first rectifier circuit, and the second power supply module further comprises a second filter disposed between the second alternating current input end and the second rectifier circuit, wherein the first filter is configured to reduce electromagnetic interference of the first AC voltage, and the second filter is configured to reduce electromagnetic interference of the second AC voltage.

13. The power supply device according to claim 1, wherein, in response to the switching control module receiving a special mode request and the second alternating current input end receiving the second AC voltage, the switching control module controls the first switch unit to be turned off and controls the second switch unit to be turned on according to the special mode request.

14. A power supply management module, comprising:
a first power supply module, comprising: a first alternating current input end, receiving a first AC voltage; a first rectifier circuit, rectifying the first AC voltage; and a first switch unit, comprising a first end and a second end, the first end being connected to the first rectifier circuit;
a second power supply module, comprising: a second alternating current input end, receiving a second AC voltage; a second rectifier circuit, rectifying the second AC voltage; and a second switch unit, comprising a third end and a fourth end, wherein the third end is connected to the second rectifier circuit, and the fourth end is connected to the second end of the first switch unit;
a detection unit, detecting the first alternating current input end and the second alternating current input end, and outputting a detection signal; and
a switching control module, receiving the detection signal, and controlling on and off of the first switch unit and the second switch unit according to the detection signal, so that one of the first power supply module and the second power supply module outputs a rectified voltage, wherein the first switch unit comprises a first transistor and a second transistor, a drain of the first transistor is connected to a drain of the second transistor, a source of the first transistor is the first end of the first switch unit, and a source of the second transistor is the second end of the first switch unit; and the second switch unit comprises a third transistor and a fourth transistor, a drain of the third transistor is connected to a drain of the fourth transistor, a source of the third transistor is the third end of the second switch unit, and source of the fourth transistor is the fourth end of the second switch unit, wherein the source of the first transistor is connected to an anode of the first diode, the drain of the first transistor is connected to a cathode of the first diode, the source of the second transistor is connected to an anode of a second diode, and the drain of the second transistor is connected to a cathode of the second diode, to block the rectified voltage output when both the first transistor and the second transistor are turned off.

15. The power supply management module according to claim 14, wherein, in response to the detection signal indicating that the first alternating current input end receives the first AC voltage, the switching control module controls the first switch unit to be turned on, and controls the second switch unit to be turned off; and in response to the detection signal indicating that the first alternating current input end does not receive the first AC voltage and the second alternating current input end receives the second AC voltage, the switching control module controls the first switch unit to be turned off, and controls the second switch unit to be turned on.

16. A power supply management method, applicable to a power supply management module, wherein the power supply management module comprises:

a first power supply module, comprising: a first alternating current input end; a first rectifier circuit; and a first switch unit, comprising a first end and a second end, wherein the first end is connected to the first rectifier circuit; and a second power supply module, comprising: a second alternating current input end; a second rectifier circuit; and a second switch unit, comprising a third end and a fourth end, wherein the third end is connected to the second rectifier circuit, and the fourth end is connected to the second end of the first switch unit; wherein the first switch unit comprises a first transistor and a second transistor, a drain of the first transistor is connected to a drain of the second transistor, a source of the first transistor is the first end of the first switch unit, and a source of the second transistor is the second end of the first switch unit; and the second switch unit comprises a third transistor and a fourth transistor, a drain of the third transistor is connected to a drain of the fourth transistor, a source of the third transistor is the third end of the second switch unit, and source of the fourth transistor is the fourth end of the second switch unit, wherein the source of the first transistor is connected to an anode of a first diode, the drain of the first transistor is connected to a cathode of the first diode, the source of the second transistor is connected to an anode of a second diode, and the drain of the second transistor is connected to a cathode of the second diode; and the power supply management method comprises the following steps:

receiving, by the first alternating current input end, a first AC voltage, and rectifying, by the first rectifier circuit, the first AC voltage;

receiving, by the second alternating current input end, a second AC voltage, and rectifying, by the second rectifier circuit, the second AC voltage;

detecting, by a detection unit, the first alternating current input end and the second alternating current input end, and outputting a detection signal; and receiving, by a switching control module, the detection signal, and controlling on and off of the first transistor and the second transistor of the first switch unit and the third transistor and the fourth transistor of the second switch unit according to the detection signal, so that one of the first power supply module and the second power supply module outputs a rectified voltage.

17. The power supply management method according to claim 16, wherein the step of receiving, by the switching control module, the detection signal, and controlling on and off of the first switch unit and the second switch unit according to the detection signal, so that one of the first power supply module and the second power supply module outputs the rectified voltage comprises: in response to the detection signal indicating that the first alternating current input end receives the first AC voltage normally, controlling, by the switching control module, the first switch unit to be turned on, and controlling the second switch unit to be turned off; and in response to the detection signal indicating that the first alternating current input end does not receive the first AC voltage normally and the second alternating current input end receives the second AC voltage normally, controlling, by the switching control module, the first switch unit to be turned off, and controlling the second switch unit to be turned on.

18. The power supply management method according to claim 16, wherein the power supply management method further comprises: in response to the switching control module receiving a special mode request and the second alternating current input end receiving the second AC voltage, controlling, by the switching control module, the first switch unit to be turned off and controlling the second switch unit to be turned on according to the special mode request.

* * * * *